US012746789B2

(12) United States Patent
Taylor et al.

(10) Patent No.: US 12,746,789 B2
(45) Date of Patent: Sep. 29, 2026

(54) MOVABLE TOW HOOK ASSEMBLIES AND VEHICLES INCLUDING SAME PROVIDING SOLENOID-CONTROLLED IMPACT ABSORPTION

(71) Applicant: Toyota Motor Engineering & Manufacturing North America, Inc., Plano, TX (US)

(72) Inventors: Joseph C. Taylor, Ypsilanti, MI (US); Aaron R. Steinhilb, Milan, MI (US); Phouvadol P. Khouphongsy, Saline, MI (US); Troy N. Grantham, Saline, MI (US); Haley L. Grantham, Saline, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 380 days.

(21) Appl. No.: 18/603,767

(22) Filed: Mar. 13, 2024

(65) Prior Publication Data

US 2025/0289276 A1 Sep. 18, 2025

(51) Int. Cl.

*B60D 1/24* (2006.01)
*B60D 1/04* (2006.01)
*B60R 16/03* (2006.01)

(52) U.S. Cl.

CPC ............... *B60D 1/243* (2013.01); *B60D 1/04* (2013.01); *B60R 16/03* (2013.01)

(58) Field of Classification Search

CPC ........... B60D 1/54; B60D 1/243; B60D 1/246
See application file for complete search history.

(56) References Cited

U.S. PATENT DOCUMENTS 3,013,816 A * 12/1961 Isham .................... B60D 1/249 280/453
7,497,458 B2 3/2009 Daniel
8,794,656 B2 * 8/2014 West .................. B62D 53/0864 280/479.2
9,914,495 B2 * 3/2018 Han ..................... B62D 47/006
10,464,382 B2 * 11/2019 Ghannam .............. B60D 1/243
(Continued)

FOREIGN PATENT DOCUMENTS

CN 107696807 A * 2/2018 ............. B60D 1/243
CN 114083943 A 2/2022
(Continued)

*Primary Examiner* — Minnah L Seoh
*Assistant Examiner* — Hosam Shabara
(74) *Attorney, Agent, or Firm* — Dinsmore & Shohl LLP

(57) ABSTRACT

A tow hook assembly includes a housing and a tow hook. The housing includes one or more side walls, a rear wall, a front wall, an aperture formed in the front wall, and a housing coil encircling the one or more side walls. The tow hook is slidably movable through the aperture of the housing between an extended position and a retracted position. The tow hook includes a tow hook coil encircling an outer surface of the tow hook. The housing coil and the tow hook coil are configured to receive current and cooperate to provide an energy absorption effect inhibiting the tow hook from contacting the rear wall of the housing during movement from the extended position to the retracted position.

14 Claims, 4 Drawing Sheets

(56) References Cited

U.S. PATENT DOCUMENTS

| | | | | |
|---|---|---|---|---|
| 10,787,052 | B2 * | 9/2020 | Shenaq | B60D 1/54 |
| 12,479,247 | B2 * | 11/2025 | Steinhilb | B60D 1/249 |

FOREIGN PATENT DOCUMENTS

| | | | |
|---|---|---|---|
| CN | 219172113 | U | 6/2023 |
| EP | 3708391 | B1 | 5/2022 |
| KR | 100198756 | B1 | 6/1999 |

* cited by examiner

MOVABLE TOW HOOK ASSEMBLIES AND VEHICLES INCLUDING SAME PROVIDING SOLENOID-CONTROLLED IMPACT ABSORPTION

TECHNICAL FIELD

The present specification generally relates to tow hooks for vehicles and, more specifically, movable tow hooks that provide impact absorption of a movable portion of the tow hook with a fixed portion of the tow hook.

BACKGROUND

Current tow hooks may attach or be fixed to a vehicle at different connection points so that the tow hook is operable to remain on the vehicle while a towing force is applied to the tow hook. However, during a collision, the tow hook may contact a barrier that may cause further damage to internal components of the vehicle located rearward of the tow hook and to the barrier itself. As such, tow hooks may include a movable or retractable portion to reduce damage to components of the vehicle as well as to an object contacted by the vehicle during the collision. However, the movable or retractable portion of the tow hooks may damage other portions of the tow hook, or the movable portion itself, when contacting remaining fixed portions of the tow hooks.

Accordingly, a need exists for improved tow hooks that reduce damage to individual components of the tow hook during a collision event and movement of the tow hook.

SUMMARY

In one embodiment, a tow hook assembly includes: a housing including one or more side walls, a rear wall, a front wall, an aperture formed in the front wall, and a housing coil encircling the one or more side walls; a tow hook slidably movable through the aperture of the housing between an extended position and a retracted position, the tow hook including a tow hook coil encircling an outer surface of the tow hook, wherein, upon the tow hook moving a distance exceeding a predetermined distance threshold, the housing coil and the tow hook coil receive a current such that the housing coil generates a magnetic field providing an energy absorption effect on the tow hook damping movement of the tow hook during movement from the extended position to the retracted position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
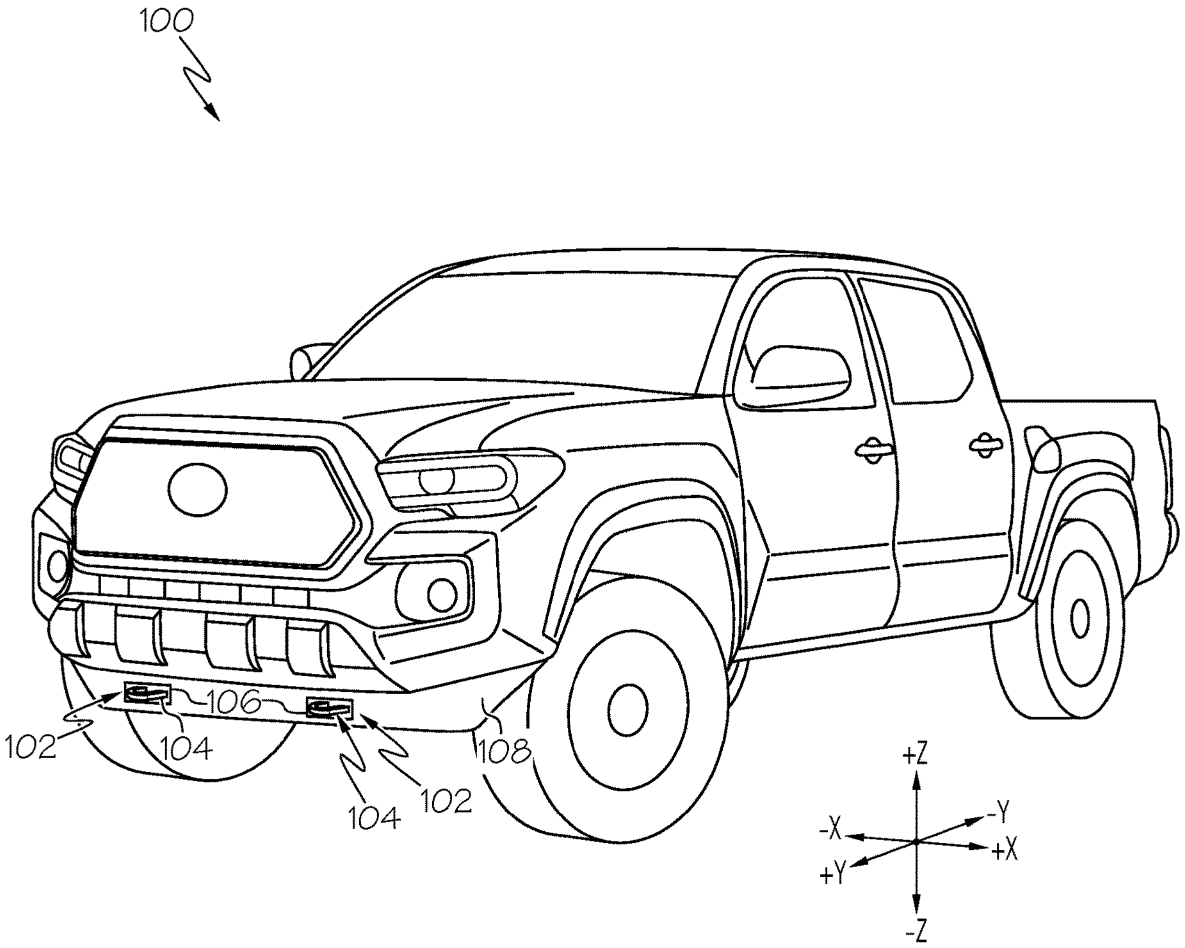
FIG. 1 schematically depicts a perspective view of a vehicle including a pair of tow hook assemblies, according to one or more embodiments shown and described herein.

Embodiments described herein are directed to a tow hook assembly that includes an energy absorption feature to prevent damage to components of the tow hook assembly during a collision. The tow hook assembly includes a housing including a housing coil, and a tow hook slidably movable through an aperture of the housing between an extended position and a retracted position. The tow hook includes a tow hook coil. The housing coil and the tow hook coil are configured to receive current and cooperate to provide an energy absorption effect inhibiting the tow hook from contacting a rear wall of the housing during movement from the extended position towards the retracted position. Various embodiments of the tow hook assembly and the operation of the tow hook assembly are described in more detail herein. Whenever possible, the same reference numerals will be used throughout the drawings to refer to the same or like parts.

As used herein, the term "vehicle longitudinal direction" refers to the forward-rearward direction of the vehicle (i.e., in the +/−Y direction of the coordinate axes depicted in FIG. 1). The term "vehicle lateral direction" refers to the cross-vehicle direction (i.e., in the +/−X direction of the coordinate axes depicted in FIG. 1), and is transverse to the vehicle longitudinal direction. The term "vehicle vertical direction" refers to the upward-downward direction of the vehicle (i.e., in the +/−Z direction of the coordinate axes depicted in FIG. 1). As used herein, "upper" and "above" are defined as the positive Z direction of the coordinate axes shown in the drawings. "Lower" and "below" are defined as the negative Z direction of the coordinate axes shown in the drawings.

Referring now to FIG. 1, a perspective view of a vehicle 100 is illustrated. As used herein, the vehicle 100 may be any instrument that is operable to transport people and/or goods from one location to another. For example, the vehicle 100 may include, but is not limited to, an automobile, car, bus, truck, boat, and the like. The vehicle 100 includes one or more tow hook assemblies 102. As shown in FIG. 1, the vehicle 100 includes a pair of tow hook assemblies 102. Each tow hook assembly 102 may be connected to any portion of the vehicle 100. For example, in some embodiments, the tow hook assemblies 102 may be attached to a front bumper or bumper beam of the vehicle 100. More particularly, in embodiments, the tow hook assemblies 102 may be attached to extend above the bumper beam of the vehicle 100. In other embodiments, the tow hook assemblies 102 may be attached to extend below the bumper beam of the vehicle 100. As shown in FIG. 1, the tow hook assemblies 102 include a tow hook 104 extending in a vehicle longitudinal direction such that at least a portion of the tow hook 104, which is coupled to the bumper beam, extends through an opening 106 formed in a bumper cover 108. The bumper cover 108 is positioned forward of the bumper beam in the vehicle longitudinal direction such that the bumper beam is not illustrated in FIG. 1.

Figure 2:
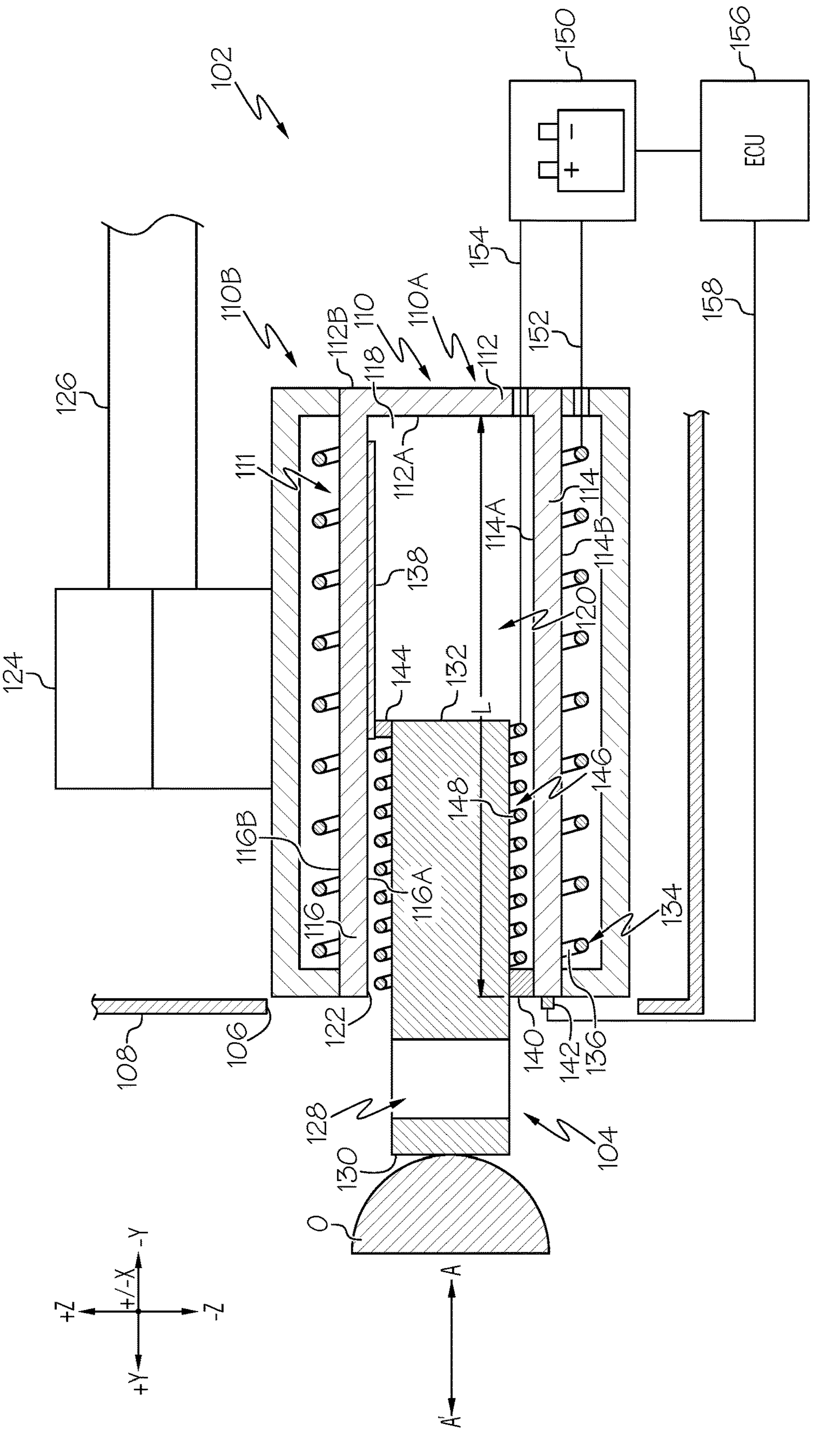
FIG. 2 schematically depicts a partial cross-sectional side view of the tow hook assembly of FIG. 1 including a tow hook in an extended position, according to one or more embodiments shown and described herein.
Figure 4:
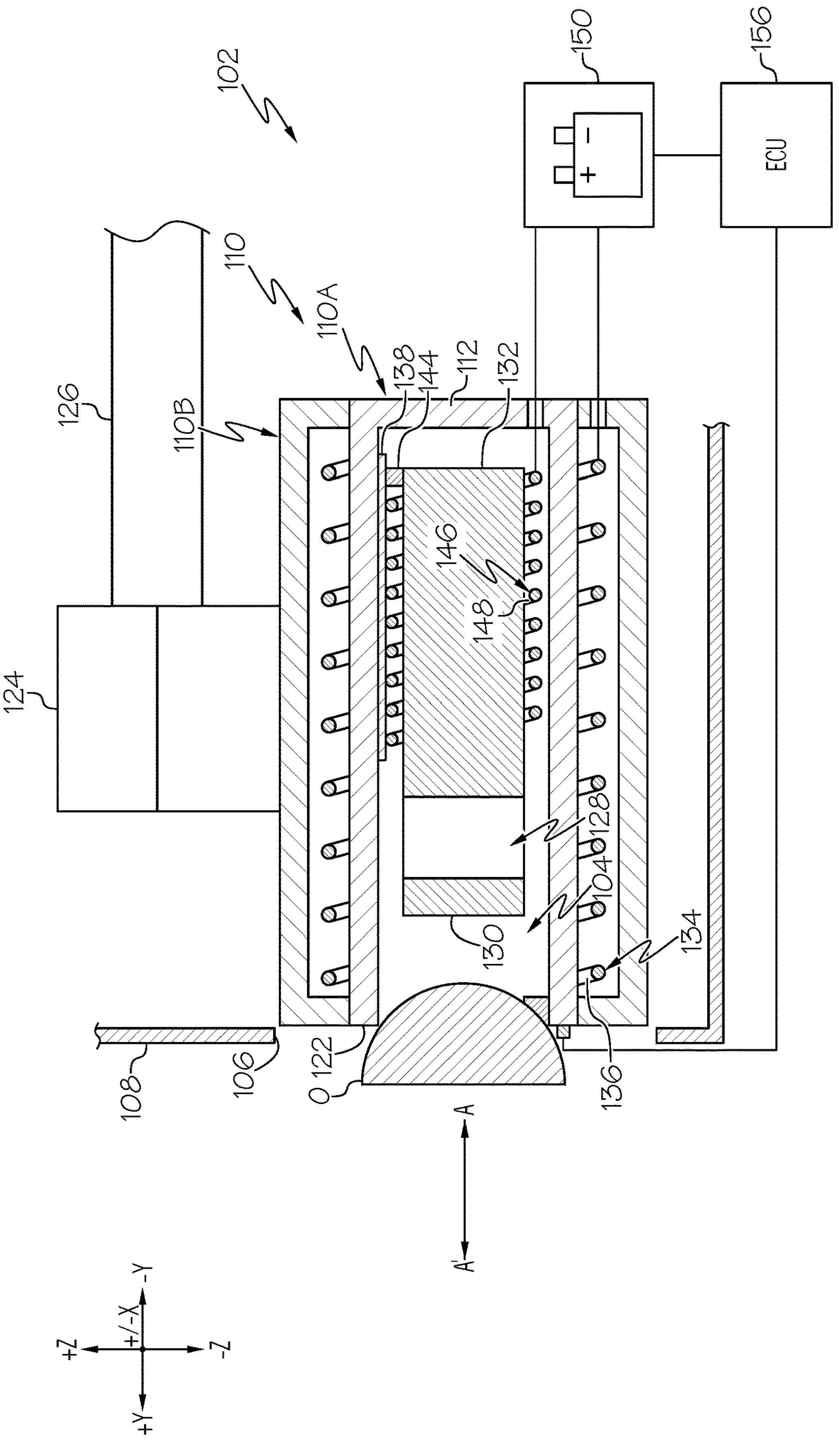
FIG. 4 schematically depicts a partial cross-sectional side view of the tow hook assembly of FIG. 1 including a tow hook in a retracted position, according to one or more embodiments shown and described herein.

Referring now to FIG. 2, the tow hook assembly 102 includes a housing 110 and the tow hook 104. In embodiments, the housing 110 includes an inner housing member 110A and an outer housing member 110B encircling the inner housing member 110A. The outer housing member 110B defines a housing channel 111 formed between the inner housing member 110A and the outer housing member 110B. The inner housing member 110A includes one or more walls including a rear wall 112, a lower wall 114, an upper wall 116 opposite the lower wall 114, and a pair of side walls 118 that define an open interior 120. The rear wall 112 has an inner surface 112A and an outer surface 112B opposite the inner surface 112A. The lower wall 114 has an inner surface 114A and an outer surface 114B opposite the inner surface 114A. The upper wall 116 has an inner surface 116A and an outer surface 116B opposite the inner surface 116A. An aperture 122 is formed in the inner housing member 110A opposite the rear wall 112 to permit the tow hook 104 to move between a first or extended position, as shown in FIG. 2, and a second or retracted position, as shown in FIG. 4, relative to the housing 110. Accordingly, the aperture 122 has any suitable geometry corresponding to a shape of the tow hook 104 such as, for example, circular, rectangular, or other regular or irregular shapes.

The housing 110 is mounted to a frame member 124, such as the bumper beam, a crush box, or the like, in any suitable manner such as, for example, mechanical fasteners, clips, adhesive, or the like. In embodiments, the outer housing member 110B is fixed to the frame member 124. In other embodiments, such as embodiments in which the outer housing member 110B is not provided, the inner housing member 110A itself may be fixed to the frame member 124. As shown in FIG. 2, the frame member 124 is provided rearward of the bumper cover 108 and a longitudinal rail 126 extends from the frame member 124 in the vehicle longitudinal direction opposite the bumper cover 108.

The inner housing member 110A includes a housing coil 134 extending along a length L of the inner housing member 110A and encircling the inner housing member 110A. The length L of the inner housing member 110A is defined between the aperture 122 of the inner housing member 110A and the rear wall 112 of the inner housing member 110A. The housing coil 134 is shown in FIG. 2 as being provided on the outer surface 114B of the lower wall 114 and the outer surface 116B of the upper wall 116. The housing coil 134 is a conductive metal wiring including a plurality of housing coil windings 136. In embodiments in which the outer housing member 110B is provided, the housing coil 134 is provided within the housing channel 111 formed therebetween. Accordingly, the outer housing member 110B inhibiting direct contact with the housing coil 134 from the surrounding components and debris.

In embodiments, the inner housing member 110A includes a track 138 for facilitating movement of the tow hook 104 along the inner housing member 110A, as described in more detail herein. As shown, the track 138 is provided on the inner surface 116A of the upper wall 116 of the inner housing member 110A. In embodiments, the track 138 is mounted to the inner surface 116A of the upper wall 116 of the inner housing member 110A. In other embodiments, the track 138 is formed within upper wall 116 of the inner housing member 110A itself. However, the track 138 may be provided at any other suitable location such as, for example, on or within the lower wall 114 of the inner housing member 110A.

In embodiments, the inner housing member 110A includes a locking member 140 for inhibiting movement of the tow hook 104 toward the retracted position from the extended position until a force exceeding a predetermined force threshold is applied against the tow hook 104, such as by an obstacle O. In embodiments, the locking member 140 may be an elastomeric protrusion providing a frictional engagement with the tow hook 104. Accordingly, the elastomeric protrusion inhibits movement of the tow hook 104 toward the retracted position until a force exceeding the predetermined force threshold is applied against the tow hook 104. In such embodiments, the locking member 140 is fixed on the inner surface 114A of the lower wall 114 of the inner housing member 110A and abuts against the tow hook 104. However, it should be appreciated that the locking member 140 may alternatively be provided on the inner surface 116A of the upper wall 116 of the inner housing member 110A or on both the inner surface 114A of the lower wall 114 and the inner surface 116A of the upper wall 116.

It should be appreciated that the locking member 140 may be any other suitable structure for inhibiting movement of the tow hook 104 toward the retracted position until a force exceeding the predetermined force threshold is applied against the tow hook 104. For example, the locking member 140 may include a frangible seal that breaks apart from the inner housing member 110A and/or the tow hook 104 upon a force exceeding the predetermined force threshold being applied against the tow hook 104. In other embodiments, the locking member 140 may include a biasing member extending from the inner housing member 110A that engages a detent formed in the tow hook 104. Similarly, upon a force exceeding the predetermined force threshold being applied against the tow hook 104, the biasing member compresses to permit the tow hook 104 to move toward the retracted position. In other embodiments, the locking member 140 may include an electromagnet operable to inhibit movement of the tow hook 104 when in an activated state and permit movement of the tow hook 104 when in a deactivated state. In other embodiments, the housing coil 134 may be operated to inhibit movement of the tow hook 104 as well.

In embodiments, the housing 110 includes a sensor 142 for detecting movement of the tow hook 104. The sensor 142 may be any suitable device such as, for example, a proximity sensor, inductive sensor, magnetic sensor, capacitive displacement sensor, potentiometer, and the like. As shown, the sensor 142 is provided on the inner housing member 110A at the aperture 122 and proximate the tow hook 104 so as to detect movement of the tow hook 104. However, it should be appreciated that the sensor 142 may be located at any suitable location such as, for example, on the tow hook 104 itself.

With respect now to the tow hook 104 itself, the tow hook 104 has a front end 130 and a rear end 132 opposite the front end 130. As discussed herein, the tow hook 104 has a shape corresponding to the aperture 122 formed in the housing 110 such that the tow hook 104 is permitted to move through the aperture 122 and within the open interior 120 of the inner housing member 110A. In embodiments, an opening 128 extends through the tow hook 104 proximate the front end 130 of the tow hook 104. The opening 128 may have any suitable shape or size such that a tow strap may attach to the tow hook 104 by extending through the opening 128. In other embodiments, an attachment member fixed or rotatably coupled to the tow hook 104, such as at the opening 128 or any other suitable location of the tow hook 104. The attachment member may have a loop shape such that a tow strap may attach to the attachment member rather than the opening 128 itself. In embodiments, the tow hook 104 has a generally hook shape.

It should be appreciated that when the tow hook 104 is positioned in the extended position, as shown in FIG. 2, the front end 130 of the tow hook 104 extends through the opening 106 formed in the bumper cover 108 such that the opening 128 is positioned at least partially at an exterior side of the vehicle 100. Alternatively, when the tow hook 104 is positioned in the retracted position, as shown in FIG. 4, the tow hook 104 is received within the open interior 120 of the inner housing member 110A such that a distance between the rear end 132 of the tow hook 104 and the rear wall 112 of the inner housing member 110A is less than a distance between the rear end 132 of the tow hook 104 and the rear wall 112 of the inner housing member 110A when the tow hook 104 is in the extended position. In other words, when the tow hook 104 is in the extended position, the tow hook 104 extends farther outward from the housing 110 than when the tow hook 104 is in the retracted position.

The tow hook 104 is coupled to the housing 110 and slidably movable therein. In embodiments, the tow hook 104 includes a protrusion 144 provided at the rear end 132 of the tow hook 104. The protrusion 144 is received within the track 138 of the inner housing member 110A to maintain longitudinal movement of the tow hook 104 within the housing 110. However, it should be appreciated that the tow hook 104 may be coupled to the inner housing member 110A and slidably movable therein by utilizing any other suitable device. For example, the tow hook 104 may include one or more rollers or friction-reducing spacers laterally positioning the tow hook 104 within the inner housing member 110A.

The tow hook 104 includes a tow hook coil 146 extending along a length of the tow hook 104 between the front end 130 and the rear end 132 of the tow hook 104 and encircling an outer surface of the tow hook 104. The tow hook coil 146 is a conductive metal wiring including a plurality of tow hook coil windings 148. Accordingly, the tow hook coil windings 148 are separated from the housing coil windings 136 by the lower wall 114, the upper wall 116, and the side walls 118 of the inner housing member 110A.

In embodiments, the tow hook 104 is mechanically actuated to move relative to the housing 110 between the extended position and the retracted position by providing current to the housing coil 134 and the tow hook coil 146 from a power source 150. Specifically, the power source 150 is electrically coupled to the housing coil 134 by a first lead 152 and to the tow hook coil 146 by a second lead 154 extending from the power source 150.

The power source 150 is operated in response to receiving a signal from an electronic control unit 156. The electronic control unit 156 includes one or more processors and one or more memory modules. Each of the one or more processors may be any device capable of executing machine readable and executable instructions. Accordingly, each of the one or more processors may be a controller, an integrated circuit, a microchip, a computer, or any other computing device. The one or more memory modules may comprise RAM, ROM, flash memories, hard drives, or any device capable of storing machine readable and executable instructions such that the machine readable and executable instructions can be accessed by the one or more processors. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

As shown, the electronic control unit 156 is electrically coupled to the sensor 142 by a third lead 158. However, it should be appreciated that the electronic control unit 156 may be wirelessly connected to the sensor 142. The electronic control unit 156 receives a signal from the sensor 142 when the tow hook 104 moves. In response to determining that the tow hook 104 has moved a distance exceeding a predetermined distance threshold in the direction of arrow A, the electronic control unit 156 sends a signal to the power source 150 to provide current to the housing coil 134 and the tow hook coil 146. In embodiments, the predetermined distance threshold is equal to or greater than 0.5 millimeters (mm). In embodiments, the predetermined distance threshold is equal to or greater than 1 mm. In embodiments, the predetermined distance threshold is equal to or greater than 2 mm. In embodiments, the predetermined distance threshold is equal to or greater than 5 mm. In embodiments, the predetermined distance threshold is equal to or greater than 10 mm. In embodiments, the predetermined distance threshold is equal to or greater than 20 mm.

The sensor 142 detects movement of the tow hook 104 in the direction of arrow A and sends a signal to the electronic control unit 156. When the electronic control unit 156 determines that a distance of the movement of the tow hook 104 exceeds the predetermined distance threshold, the electronic control unit 156 instructs the power source 150 to provide a current to the housing coil 134 and the tow hook coil 146. The current provided to the housing coil 134 creates a magnetic field B through which the tow hook 104 slides through. A magnetic moment m induced by the tow hook coil 146 is subjected to a force in the direction of arrow A', which is opposite the moving direction of the tow hook 104 as the tow hook 104 moves through the housing 110 and toward the retracted position, i.e., the direction of arrow A.

In embodiments, the magnetic field B created by the housing coil 134 is a non-uniform magnetic field B such that a force F exhibited on the tow hook 104 increases as the tow hook 104 moves further toward the retracted position in the direction of arrow A. This provides low-load, energy efficient impact absorption to prevent the rear end 132 of the tow hook 104 from impacting the rear wall 112 of inner housing member 110A. The force F on the tow hook 104 is determined according to expression (1):

$$F = \nabla(m \cdot B) \tag{1}$$

The magnetic field B increases as the tow hook 104 travels in the direction of arrow A to generate the force F in the direction of arrow A'. The magnetic moment m is determined according to expression (2):

$$m = niA \tag{2}$$

In the above expression (2), n represents the number of tow hook coil windings 148, i represents the current within the tow hook coil windings 148, and A represents a cross-sectional area of the tow hook 104.

The magnetic field B within the housing 110 is determined according to expression (3):

$$B = \frac{\mu_0 N I}{L} \tag{3}$$

In the above expression (3), $\mu_0$ represents the permeability of free space, which is $4\pi 10^{-7}$ T·m/A (tesla-metre/ampere), N represents the number of housing coil windings 136, I represents the current within the housing coil windings 136, and L represents the length of the inner housing member 110A.

The gradient change ∇ in quantity m·B, which represents the force F against the tow hook 104 in the direction of arrow A' may be created by pulsing an increase in the current/ within the housing coil windings 136 and/or the current i within the tow hook coil windings 148. The gradient change ∇ may also be achieved by increasing a winding density of the number N of the housing coil windings 136 in the direction of arrow A. Alternatively, the gradient change ∇ may be achieved by decreasing a winding density of the number n of the tow hook coil windings 148 in the direction of arrow A'. Accordingly, the force F is tuned as desired to provide low-load, energy efficient impact absorption. More particularly, as discussed above, this provides energy absorption against the movement of the tow hook 104 to inhibit contact of the rear end 132 of the tow hook 104 against the rear wall 112 of the inner housing member 110A. This reduces the likelihood of damage to the housing 110 and the tow hook 104.

In operation, referring still to FIG. 2, the tow hook 104 is shown in the extended position. During a collision, such as a front end collision, the obstacle O contacts the front end 130 of the tow hook 104 pushing the tow hook 104 in the direction of arrow A into the housing 110. As discussed above, the sensor 142 detects movement of the tow hook 104 and sends a signal to the electronic control unit 156. Upon the electronic control unit 156 detecting that the tow hook 104 has moved a distance greater than the predetermined distance threshold, the electronic control unit 156 instructs the power source 150 to deliver current to the housing coil 134 and the tow hook coil 146.

Figure 3:
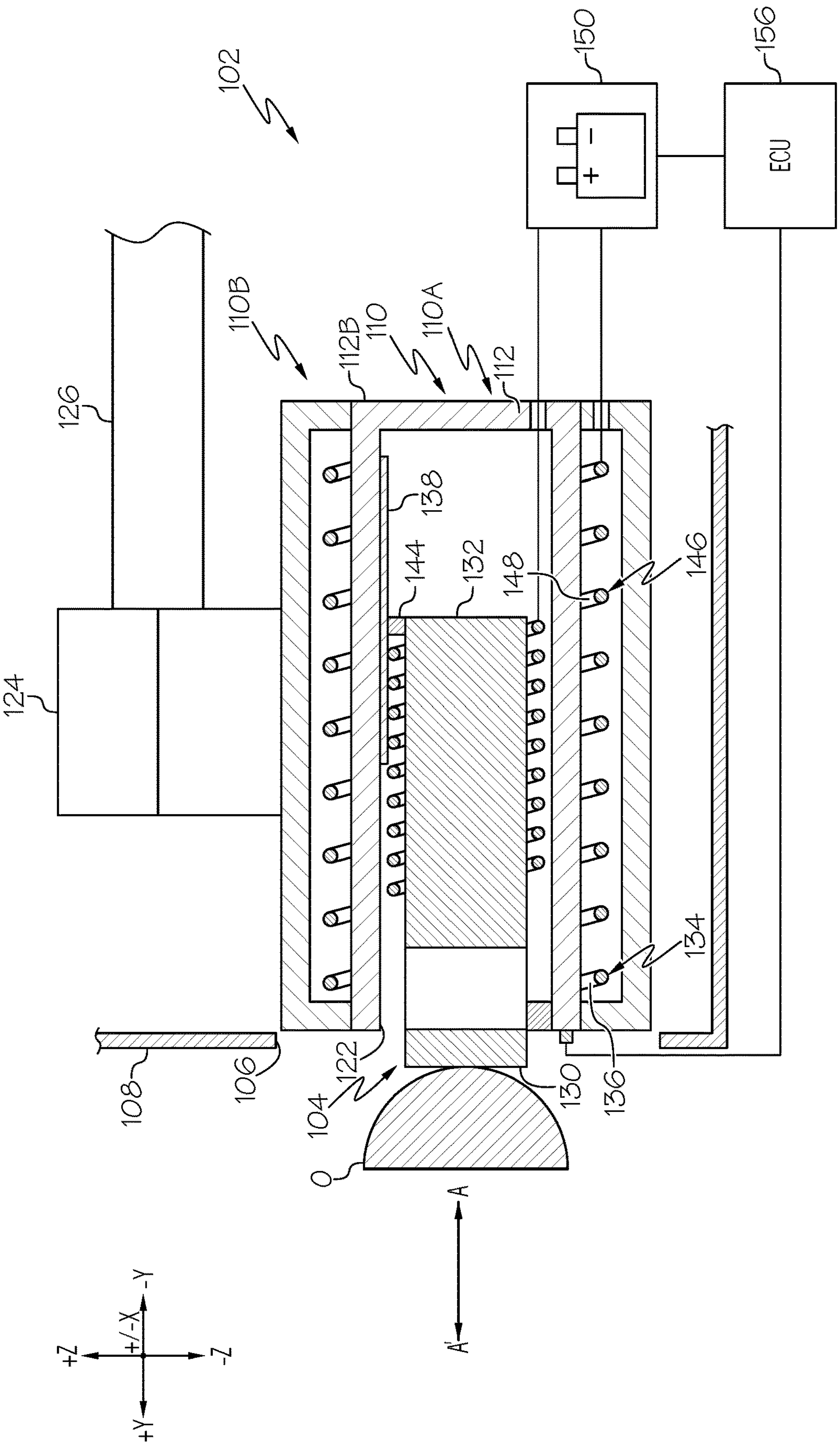
FIG. 3 schematically depicts a partial cross-sectional side view of the tow hook assembly of FIG. 1 including a tow hook in an intermediate position, according to one or more embodiments shown and described herein.

Referring now to FIG. 3, the obstacle O is shown pushing the tow hook 104 in the direction of arrow A into an intermediate position between the extended position (FIG. 2) and the retracted position (FIG. 4) relative to the housing 110. As shown, as the tow hook 104 moves from the extended position to the intermediate position, the protrusion 144 extending from the tow hook 104 engages the track 138 of the housing 110 to maintain longitudinal movement of the tow hook 104 and inhibit movement in the lateral direction. While in the intermediate position, as discussed above, the tow hook coil 146 passing through the magnetic field created by the housing coil 134 causes the tow hook 104 to experience a force in the direction of arrow A' to reduce the speed at which the tow hook 104 is moving in the direction of arrow A.

Referring now to FIG. 4, the obstacle O is shown abutting against the aperture 122 of the inner housing member 110A. Accordingly, the obstacle O is prevented from contacting the front end 130 of the tow hook 104. However, the force imparted on the tow hook 104 by the obstacle O continues to push the tow hook 104 in the direction of arrow A and into the retracted position. As shown, as the tow hook 104 moves from the intermediate position (FIG. 3) to the retracted position, the protrusion 144 extending from the tow hook 104 continues to engage the track 138 of the housing 110 to maintain longitudinal movement of the tow hook 104.

To prevent the tow hook 104 from over extending within the inner housing member 110A passed the retracted position, the housing coil 134 and the tow hook coil 146 cooperate to provide an energy absorption function. Specifically, as discussed above, the magnetic field created by the housing coil 134 increases in the −Y direction to increase the force against the tow hook 104. Without this energy absorption function, the rear end 132 of the tow hook 104 would contact the rear wall 112 of the inner housing member 110A and damage the housing 110 and the tow hook 104 itself. Although the housing coil windings 136 and the tow hook coil windings 148 are shown to be evenly spaced apart from one another, as discussed herein, it is appreciated that the density of the housing coil windings 136 and the tow hook coil windings 148 may be adjusted to tune the amount of force and location of force imparted onto the tow hook 104 by the housing coil 134.

To reposition the tow hook 104 from the retracted position into the extended position (FIG. 2), the power source 150 is deactivated to permit the tow hook 104 to be manually pulled, such as by a user's fingers or tool engaging the opening 128, in the direction of arrow A' and positioned back into the extended position. Thereafter, the tow hook assembly 102 may be repeatedly operated in the manner described herein.

From the above, it is to be appreciated that defined herein is a tow hook assembly including a housing including a housing coil, and a tow hook slidably movable through an aperture of the housing between an extended position and a retracted position. The tow hook includes a tow hook coil. The housing coil and the tow hook coil are configured to receive current and cooperate to provide an energy absorption effect inhibiting the tow hook from contacting a rear wall of the housing during movement from the extended position to the retracted position. Accordingly, damage to surrounding components of the tow hook assembly, as well as the tow hook assembly itself, may be minimized.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A tow hook assembly comprising:

a housing including one or more side walls, a rear wall, a front wall, an aperture formed in the front wall, and a housing coil encircling the one or more side walls;

a tow hook slidably movable through the aperture of the housing between an extended position and a retracted position, the tow hook including a tow hook coil encircling an outer surface of the tow hook, wherein, upon the tow hook moving a distance exceeding a predetermined distance threshold, the housing coil and the tow hook coil receive a current such that the housing coil generates a magnetic field providing an energy absorption effect on the tow hook damping movement of the tow hook during movement from the extended position to the retracted position.

2. The tow hook assembly of claim 1, further comprising:

a power source electrically coupled to the housing coil and the tow hook coil; and an electronic control unit electrically coupled to the power source, the electronic control unit configured to send a signal to the power source to provide the current to the housing coil and the tow hook coil upon a force exceeding a predetermined force threshold being applied to the tow hook.

3. The tow hook assembly of claim 2, further comprising:

a sensor electrically coupled to the electronic control unit, the sensor configured to send a signal to the electronic control unit indicating movement of the tow hook relative to the housing, wherein the electronic control unit is configured to send a signal to the power source to provide the current to the housing coil and the tow hook coil in response to determining that the distance of movement of the tow hook based upon the signal received from the sensor exceeds the predetermined distance threshold.

4. The tow hook assembly of claim 3, wherein the sensor is fixed to the housing with a field of view directed at the tow hook.

5. The tow hook assembly of claim 3, wherein the sensor is a proximity sensor.

6. The tow hook assembly of claim 3, wherein the predetermined distance threshold is equal to or greater than 10 mm.

7. The tow hook assembly of claim 1, wherein the tow hook comprises:

an inner housing member including the one or more side walls, the rear wall, and the front wall; and an outer housing member encircling the inner housing member encircling the inner housing member to define a housing channel in which the housing coil is provided.

8. The tow hook assembly of claim 1, wherein a force applied against the tow hook caused by the housing coil and the tow hook coil increases in a moving direction of the tow hook toward the retracted position.

9. The tow hook assembly of claim 1, further comprising a locking member inhibiting movement of the tow hook toward the retracted position until a force exceeding a predetermined force threshold is applied against the tow hook.

10. The tow hook assembly of claim 9, wherein the locking member is fixed to the housing and abuts against the tow hook.

11. The tow hook assembly of claim 9, wherein the locking member is an elastomeric protrusion providing a frictional engagement with the tow hook.

12. The tow hook assembly of claim 1, wherein in the extended position the tow hook extends farther outward from the housing than when in the retracted position.

13. The tow hook assembly of claim 1, wherein an opening extends through the tow hook proximate a front end of the tow hook to permit an attachment member to be attached to the tow hook.

14. The tow hook assembly of claim 1, wherein the magnetic field generated by the housing coil prevents the tow hook from contacting the rear wall of the housing.

* * * * *